(12) United States Patent
Ochiai

(10) Patent No.: US 6,520,027 B1
(45) Date of Patent: Feb. 18, 2003

(54) ULTRASONIC FLOWMETER FOR MEASURING THE FLOW RATE OF A GAS OR LIQUID BY USING AN ULTRASONIC SENSOR

(75) Inventor: Chitaka Ochiai, Omihachiman (JP)

(73) Assignee: Murata Manufacturing Co., LTD, Kyoto (JP)

(*) Notice: Subject to any disclaimer, the term of this patent is extended or adjusted under 35 U.S.C. 154(b) by 0 days.

(21) Appl. No.: 09/612,843

(22) Filed: Jul. 10, 2000

(30) Foreign Application Priority Data

Jul. 9, 1999 (JP) .............................. 11-196369

(51) Int. Cl.[7] ................................................ G01F 1/66
(52) U.S. Cl. ................................. 73/861.27; 73/861.29
(58) Field of Search ........................ 73/861.27, 861.28, 73/861.29, 861.31

(56) References Cited

U.S. PATENT DOCUMENTS 4,850,220 A * 7/1989 Asano et al. ................. 73/196

FOREIGN PATENT DOCUMENTS

EP 0845661 6/1998

* cited by examiner

Primary Examiner—Benjamin R. Fuller
Assistant Examiner—Corey D. Mack
(74) Attorney, Agent, or Firm—Keating & Bennett, LLP

(57) ABSTRACT

An ultrasonic flowmeter includes a fluid duct including therein first and second flow-paths separated by a partition and an ultrasonic sensor provided at one end of the fluid duct. A reflecting plate provided at the other end of the fluid duct reflects ultrasonic waves generated by the ultrasonic sensor and reaching the reflecting plate through the first and second flow-paths, and returns the ultrasonic waves to the ultrasonic sensor through the second and first flow-paths, respectively, which are different from the first and second flow-paths, respectively, through which the ultrasonic waves have reached the reflecting plate. The ultrasonic flowmeter also includes first and second connecting flow-paths communicating with the first flow-path at the vicinity of one end and the other end, respectively, of the fluid duct.

4 Claims, 4 Drawing Sheets

ULTRASONIC FLOWMETER FOR MEASURING THE FLOW RATE OF A GAS OR LIQUID BY USING AN ULTRASONIC SENSOR

BACKGROUND OF THE INVENTION

1. Field of the Invention

The present invention relates to ultrasonic flowmeters, particularly, to an ultrasonic flowmeter for measuring the flow rate of a gas, a liquid, and the like by using an ultrasonic sensor.

2. Description of the Related Art

A conventional ultrasonic flowmeter 1 shown in FIG. 4 includes a fluid duct 2, and ultrasonic sensors 3 and 4 provided on the inner wall of the fluid duct 2. The ultrasonic sensors 3 and 4 are disposed opposing each other in a direction inclined by a predetermined angle with respect to a line perpendicular to the path of flow in the fluid duct 2. Each of the ultrasonic sensor 3 and 4 serves for generating and receiving ultrasonic waves.

In the thus configured ultrasonic flowmeter 1 shown in FIG. 4, the ultrasonic sensor 3 is located upstream and the ultrasonic sensor 4 is located downstream of a gas G which flows in the fluid duct 2 at a certain speed.

The ultrasonic sensors 3 and 4 simultaneously generate pulsed ultrasonic waves A and B, respectively, which are received by the ultrasonic sensors 4 and 3, respectively. In this case, time $T_a$ taken for the ultrasonic wave A to be transmitted from the ultrasonic sensor 3 to the ultrasonic sensor 4 is shorter than time $T_b$ taken for the ultrasonic wave B to be transmitted from the ultrasonic sensor 4 to the ultrasonic sensor 3, because the ultrasonic wave A follows the stream of the gas G while the ultrasonic wave B is against the stream. The difference between the times $T_a$ and $T_b$ is proportional to the speed of flow of the gas G.

Therefore, by detecting the difference between the times $T_a$ and $T_b$, the speed of flow of the gas G can be measured, and when the cross-sectional area of the fluid duct 2 is known, the flow rate of the gas G can be measured with the speed of flow thereof.

A problem in the conventional ultrasonic flowmeter 1 is that a reduction in cost has not been possible because two ultrasonic sensors are required. Because of the two ultrasonic sensors being required, an additional controlling process is required so as to make the characteristics of the two ultrasonic sensors uniform, since the variation in characteristics between the two ultrasonic sensors deteriorates the measuring accuracy of the flowmeter. Another process is additionally required for selecting ultrasonic sensors having uniform characteristics, thereby preventing a reduction in cost.

SUMMARY OF THE INVENTION

Accordingly, it is an object of the present invention to provide an ultrasonic flowmeter in which a problem caused by variations in characteristics of ultrasonic sensors is solved, whereby a reduction in cost is possible.

To this end, according to an aspect of the present invention, an ultrasonic flowmeter comprises a fluid duct including therein first and second flow-paths separated by a partition and an ultrasonic sensor provided at one end of the fluid duct. A reflecting plate provided at the other end of the fluid duct reflects ultrasonic waves generated by the ultrasonic sensor and reaching the reflecting plate through the first and second flow-paths, and returns the ultrasonic waves to the ultrasonic sensor through the second and first flow-paths, respectively, which are different from the first and second flow-paths, respectively, through which the ultrasonic waves have reached the reflecting plate. First and second connecting flow-paths communicate with the first flow-path at the vicinity of one end and the other end, respectively, of the fluid duct.

The ultrasonic flowmeter according to the present invention may further comprise first and second connecting ducts connected with the fluid duct at the vicinity of one end and the other end, respectively, of the fluid duct. The first and second connecting ducts include the first and second flow-paths, respectively, formed in the first and second connecting ducts, respectively.

Manufacturing cost of the ultrasonic flowmeter thus configured according to the present invention can be reduced.

DESCRIPTION OF THE PREFERRED EMBODIMENTS

Figure 1:
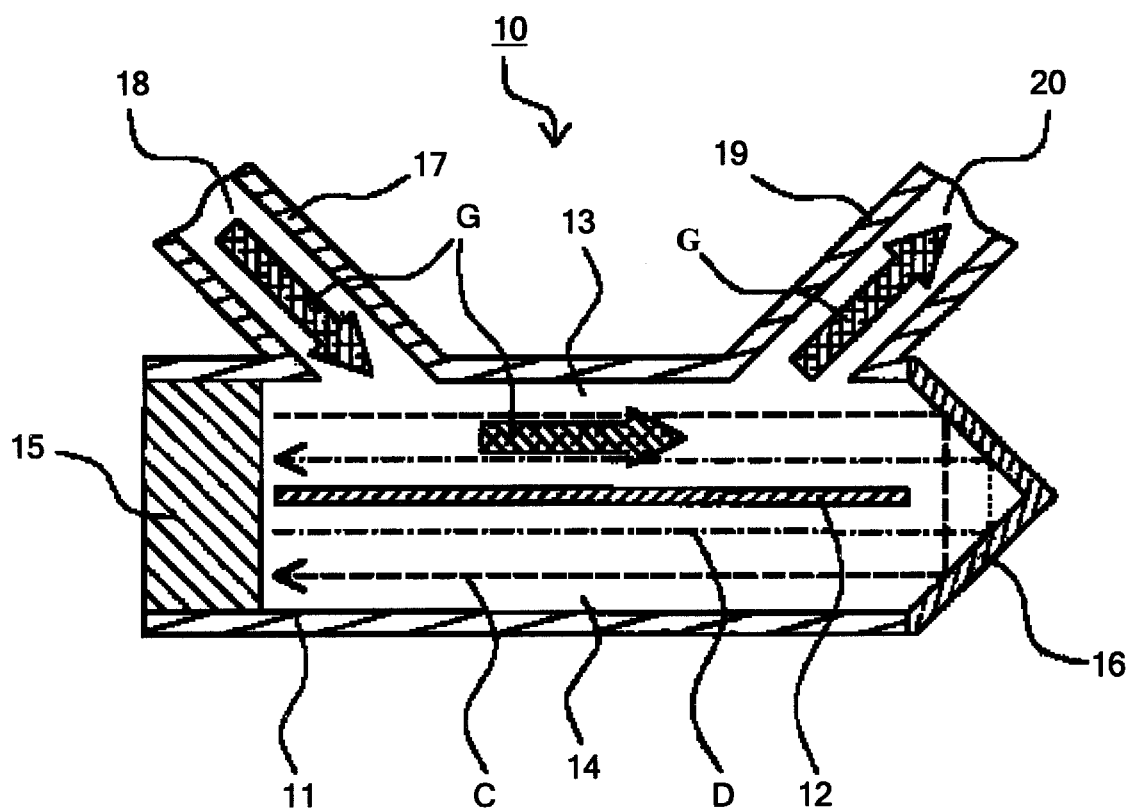
FIG. 1 is a sectional view of an ultrasonic flowmeter according to an embodiment of the present invention.

FIG. 1 shows an embodiment of an ultrasonic flowmeter according to the present invention. FIG. 1 is a sectional view of the ultrasonic flowmeter. An ultrasonic flowmeter 10 shown in FIG. 1 includes a fluid duct 11, an ultrasonic sensor 15 provided at an end of the fluid duct 11, a reflecting plate 16 provided at the other end of the fluid duct 11, and connecting ducts 17 and 19 connected with the fluid duct 11. The path of flow in the fluid duct 11 is divided by a partition 12 into a first flow-path 13 and a second flow-path 14. The connecting ducts 17 and 19 are connected with the first flow-path 13 of the fluid duct 11 at portions adjacent to one end and to the other end of the fluid duct 11, respectively. The connecting ducts 17 and 19 include therein a first connecting path 18 and a second connecting path 20, respectively, the first and second connecting paths 18 and 20 communicating with the first flow-path 13.

In the thus configured ultrasonic flowmeter 10, when a gas G flows into the fluid duct 11 through the first connecting path 18, the first flow-path 13 and the second flow-path 14 of the fluid duct 11 are filled with the gas G, then the gas G flows out through the second connecting path 20. While the gas G is kept flowing into the fluid duct 11 through the first connecting path 18, the gas G is kept flowing from the first connecting path 18 to the second connecting path 20 through the first flow-path 13, and the gas G filling the second flow-path 14 remains in the second flow-path 14 without substantially moving.

Pulsed ultrasonic waves outputted from the ultrasonic sensor 15 reach the reflecting plate 16 through the first and second flow-paths 13 and 14. An ultrasonic wave C and an ultrasonic wave D passing the first flow-path 13 and the second flow-path 14, respectively, reach the reflecting plate 16, and return to the ultrasonic sensor 15 through the second and first flow-paths 14 and 13, respectively. That is, the ultrasonic wave C passing the first flow-path 13 is reflected by the reflecting plate 16 and reaches the ultrasonic sensor 15 through the second flow-path 14. The ultrasonic wave D passing the second flow-path 14 is reflected by the reflecting plate 16 and reaches the ultrasonic sensor 15 through the first flow-path 13. The ultrasonic waves C and D are received by the ultrasonic sensor 15 which has been switched into a receiving mode after having outputted the pulsed ultrasonic waves C and D.

In this case, the gas G flows between the first connecting path 18 and the second connecting path 20 in a direction from the ultrasonic sensor 15 toward the reflecting plate 16. Therefore, the speed of the ultrasonic wave C transmitted in the first flow-path 13 from the ultrasonic sensor 15 to the reflecting plate 16 is higher than the speed of the ultrasonic wave D transmitted from the reflecting plate 16 to the ultrasonic sensor 15. Since the gas G does not flow in the second flow-path 14, the speed of the ultrasonic wave D transmitted from the ultrasonic sensor 15 to the reflecting plate 16 is the same as that of the ultrasonic wave C transmitted from the reflecting plate 16 to the ultrasonic sensor 15.

The ultrasonic wave C, which is outputted by the ultrasonic sensor 15 simultaneously with the ultrasonic wave D and transmitted through the first flow-path 13 from the ultrasonic sensor 15 toward the reflecting plate 16, returns to and is received by the ultrasonic sensor 15 earlier than the ultrasonic wave D transmitted back to the ultrasonic sensor 15 from the reflecting plate 16 through the first flow-path 13. The difference between the time of receipt of the ultrasonic wave C and that of the ultrasonic wave D is proportional to the speed of flow of the gas G in the first flow-path 13. Therefore, the speed and the quantity of flow of the gas G can be measured by detecting the difference between the times of receipt of each of the ultrasonic waves C and D.

Figure 2:
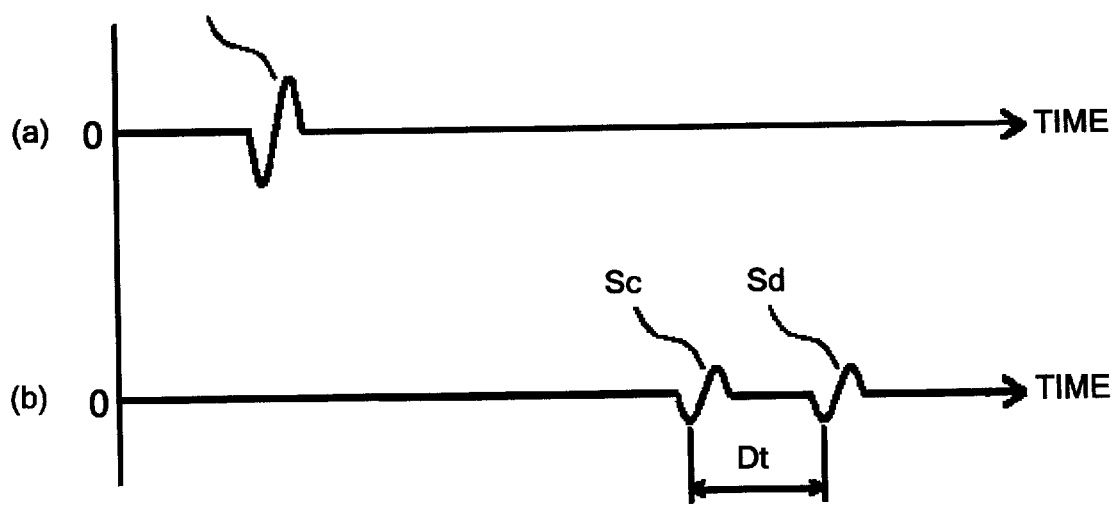
FIG. 2 is a graph showing waveforms of an output signal and an input signal of the ultrasonic flowmeter according to the embodiment of the present invention.

FIG. 2 shows the relationship in time between a signal of emission and signals of receipt of ultrasonic waves outputted by the ultrasonic sensor 15. In FIG. 2, the signal of emission is shown on a line (a), and the signals of receipt are shown on a line (b).

As shown in FIG. 2, a pulsed signal $S_t$ is transmitted in such a manner that the signal $S_t$ is outputted by the ultrasonic sensor 15 as a signal of emission of the ultrasonic waves C and D which are transmitted through the first and second flow-paths 13 and 14, respectively, to the reflecting plate 16, and transmitted back to and received by the ultrasonic sensor 15. In this case, the ultrasonic wave C which reaches the ultrasonic sensor 15 earlier than the other is received thereby as a signal $S_c$. The ultrasonic wave D, which reaches the ultrasonic sensor 15 later than the ultrasonic wave C, is received by the ultrasonic sensor 15 as a signal $S_d$. There is a difference $D_t$ in time between the signals $S_c$ and $S_d$. As described above, the difference in time $D_t$ is proportional to the speed of flow of the gas G; therefore, by detecting the difference in time $D_t$, the speed and the quantity of flow of the gas G can be measured.

In the ultrasonic flowmeter 10, when the gas G flows in the reverse direction through the first flow-path 13, the ultrasonic wave D reaches the ultrasonic sensor 15 earlier than the ultrasonic wave C. Therefore, the signal $S_d$ is inputted to the ultrasonic sensor 15 earlier than the signal $S_c$. In this case, the speed and the quantity of flow of the gas G can be also measured in the same way.

Figure 3A:
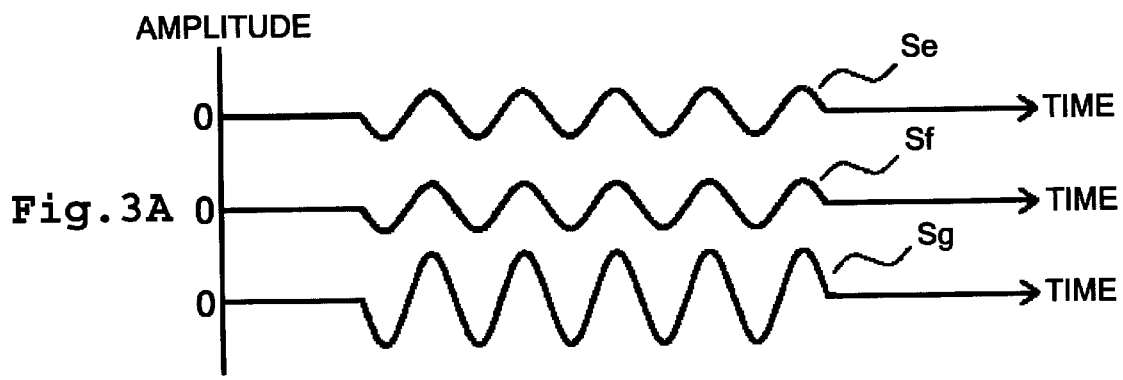
FIGS. 3A, 3B, and 3C are graphs showing other waveforms of the output signals and input signals of the ultrasonic flowmeter according to the embodiment of the present invention.
Figure 3B:
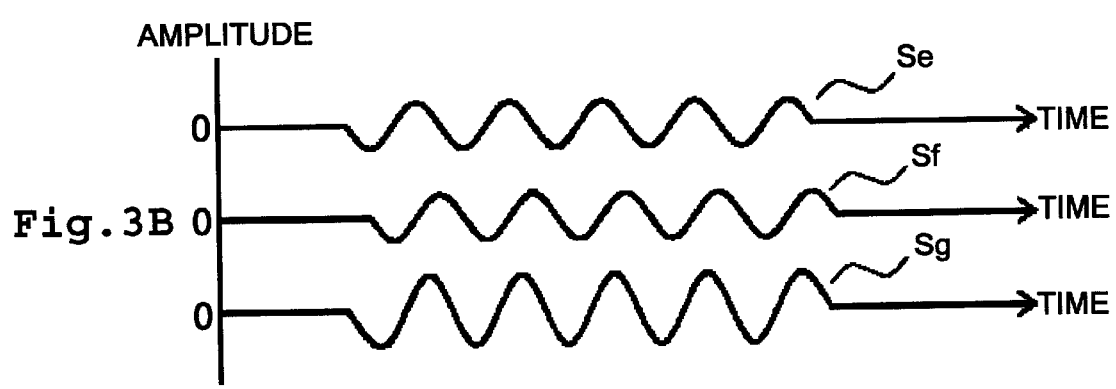
Figure 3C:
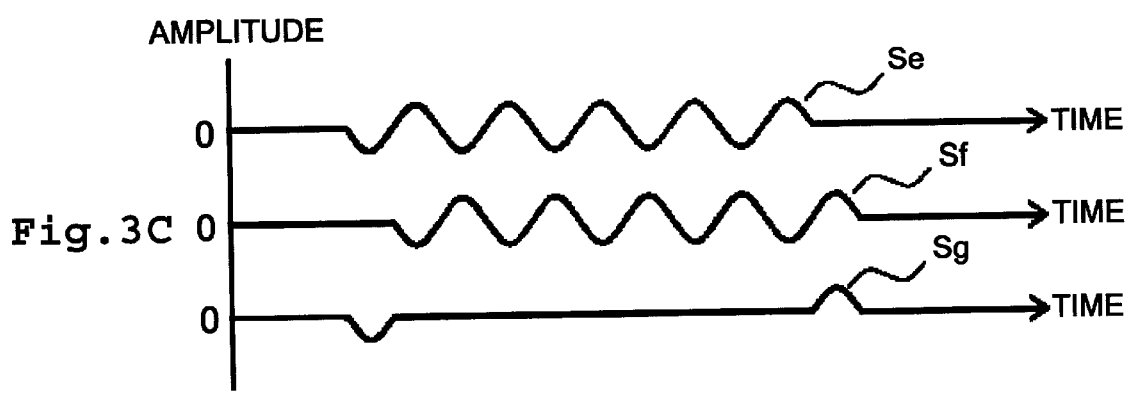
Figure 4:
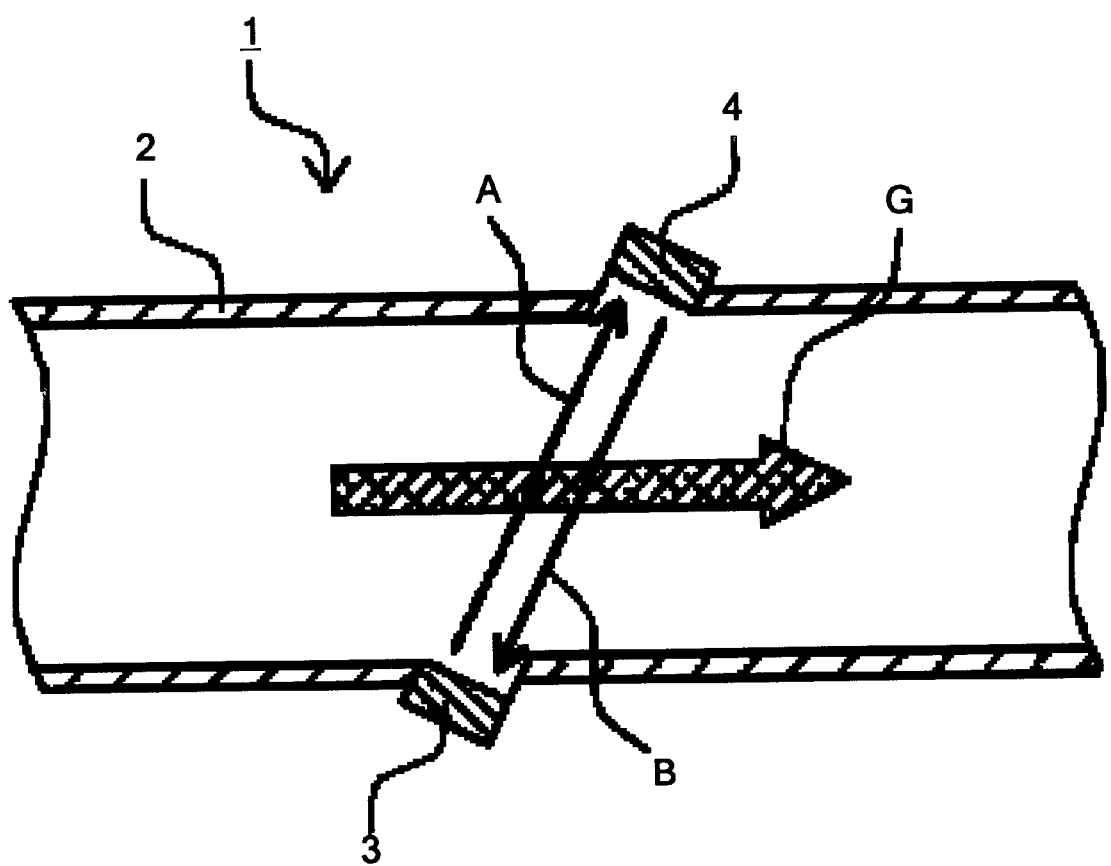
FIG. 4 is a sectional view of a conventional ultrasonic flowmeter.

Although the ultrasonic sensor 15 generates pulsed ultrasonic waves in the above-described embodiment, the ultrasonic waves may be generated in a burst mode by the ultrasonic sensor 15, in which a plurality of waves are outputted simultaneously. Each of FIGS. 3A, 3B, and 3C shows waveforms, when the ultrasonic sensor 15 generates ultrasonic waves in a burst mode, of a receipt signal $S_e$ of an ultrasonic wave E transmitted from the ultrasonic sensor 15 toward the reflecting plate 16 through the first flow-path 13, a receipt signal $S_f$ of an ultrasonic wave F transmitted from the reflecting plate 16 toward the ultrasonic sensor 15 through the first flow-path 13, and an output signal $S_g$ which the ultrasonic sensor 15 outputs by receiving the signals $S_e$ and $S_f$ and combining the same. FIG. 3A shows a case in which the speed of flow of the gas G is zero. FIG. 3B shows a case in which the gas G flows at a certain speed. FIG. 3C shows a case in which the gas G flows at a speed higher than in the case shown in FIG. 3B. In FIGS. 3A, 3B, and 3C, the horizontal axes denote time and the vertical axes denote the amplitude of the signals.

In FIG. 3A, the phases of the receipt signals $S_e$ and $S_f$ coincide with each other when the gas G does not flow, thereby increasing the amplitude of the output signal $S_g$ including the receipt signals $S_e$ and $S_f$ being combined.

In FIG. 3B, when the gas G flows at a certain speed, the receipt signal $S_e$ starts earlier than the receipt signal $S_f$, the receipt signals $S_e$ and $S_f$ having different phases. The amplitude of the output signal $S_g$ including the receipt signals $S_e$ and $S_f$ being combined is decreased compared with the case in which the gas G does not flow, because some portions of the receipt signals $S_e$ and $S_f$ cancel each other.

In FIG. 3C, when the gas G flows at a speed higher than in the case shown in FIG. 3B, a greater deviation in phase between the receipt signals $S_e$ and $S_f$ occurs, and in some occasions, to an extent in which the phases are deviated from each other by a half signal cycle. In this case, the amplitude of the output signal $S_g$ is very small because the receipt signals $S_e$ and $S_f$ forming the output signal $S_g$ mostly cancel each other.

The speed of flow of the gas G can be detected not only by using the difference in time between the signals of receipt by the ultrasonic sensor 15, but also by using the amplitude of the signals outputted by the ultrasonic sensor 15.

As described above, in the ultrasonic flowmeter 10 according to the present invention, the quantity of flow can be measured by using one ultrasonic sensor, thereby reducing the manufacturing cost compared with the conventional ultrasonic flowmeter using two ultrasonic sensors. The reduction in manufacturing cost of the ultrasonic flowmeter is also possible because it is not necessary to consider the variations in characteristics of ultrasonic sensors since a configuration with one ultrasonic sensor is used.

Although, in the embodiment of the ultrasonic flowmeter 10, the quantity of flow of a gas is measured, the present invention is not limited to the ultrasonic flowmeter for gasses, and it may be also applied to an ultrasonic flowmeter for measuring the quantity of flow of a liquid.

The ultrasonic flowmeter according to the present invention includes a fluid duct having therein first and second flow-paths separated by a partition and an ultrasonic sensor provided at one end of the fluid duct. A reflecting plate provided at the other end of the fluid duct reflects ultrasonic waves generated by the ultrasonic sensor and reaching the reflecting plate through the first and second flow-paths, and returns the ultrasonic waves to the ultrasonic sensor through the second and first flow-paths different from the first and second flow-paths, respectively, through which the ultrasonic waves have reached the reflecting plate. First and second connecting paths communicate with the first flow-path at the vicinity of one end and the other end, respectively, of the fluid duct. With this arrangement, an ultrasonic flowmeter using one ultrasonic sensor is made possible, thereby reducing manufacturing costs of the ultrasonic flowmeter.

What is claimed is:

1. An ultrasonic flowmeter comprising:

a fluid duct including therein first and second flow-paths separated by a partition;

an ultrasonic sensor provided at one end of the fluid duct;

a reflecting plate provided at the other end of the fluid duct, for reflecting ultrasonic waves generated by the ultrasonic sensor and reaching the reflecting plate through the first and second flow-paths, and for returning the ultrasonic waves to the ultrasonic sensor through the second and first flow-paths, respectively, which are different from the first and second flow-paths, respectively, through which the ultrasonic waves have reached the reflecting plate; and first and second connecting flow-paths communicating with the first flow-path at the vicinity of one end and the other end, respectively of the fluid duct such that fluid flows mostly in the first flow-path and not in the second flow-path.

2. An ultrasonic flowmeter according to claim 1, further comprising first and second connecting ducts connected with the fluid duct at the vicinity of one end and the other end, respectively, of the fluid duct, wherein the first and second connecting ducts include the first and second flow-paths, respectively, formed in the first and second connecting ducts, respectively.

3. An ultrasonic flowmeter comprising:

a fluid duct having opposing ends and including therein first and second passages separated by a partition;

an ultrasonic sensor provided at only one of the ends of the fluid duct;

a reflecting plate provided at the other of the ends of the fluid duct, for reflecting ultrasonic waves generated by the ultrasonic sensor and reaching the reflecting plate through the first and second passages, and for returning the ultrasonic waves to the ultrasonic sensor through the second and first passages, respectively, which are different from the first and second passages, respectively, through which the ultrasonic waves have reached the reflecting plate; and first and second connecting passages communicating with the first passage at the vicinity of one end and the other end, respectively of the fluid duct, such that fluid flows mostly in the first passage and not in the second passage.

4. An ultrasonic flowmeter comprising:

a fluid duct including therein first and second passages structured and arranged such that fluid flows mostly in one of the passages and not in the other of the passages;

an ultrasonic sensor provided at one end of the fluid duct; and a reflecting plate provided at the other end of the fluid duct, for reflecting ultrasonic waved generated by the ultrasonic sensor and reaching the reflecting plate through the first and second passages, and for returning the ultrasonic waves to the ultrasonic sensor through the second and first passages, respectively, which are different from the first and second passages, respectively, through which the ultrasonic waves have reached the reflecting plate.

* * * * *